United States Patent [19]

Asano

[11] Patent Number: 4,821,604
[45] Date of Patent: Apr. 18, 1989

[54] FOUR-WHEEL DRIVE SYSTEM

[75] Inventor: Hiroaki Asano, Okazaki, Japan

[73] Assignee: Toyoda Koki Kabushiki Kaisha, Kariya, Japan

[21] Appl. No.: 58,868

[22] Filed: Jun. 5, 1987

[30] Foreign Application Priority Data

Jun. 6, 1986 [JP] Japan .................... 61-132201

[51] Int. Cl.⁴ .................... F16H 47/00; F16H 1/44
[52] U.S. Cl. ......................... 74/718; 74/711; 192/103 F; 180/248
[58] Field of Search .................. 74/718, 687, 731, 711, 74/710.5, 866, 733; 180/242, 243, 248, 249; 192/103 F, 0.033

[56] References Cited

U.S. PATENT DOCUMENTS

| | | | |
|---|---|---|---|
| 2,583,307 | 1/1952 | Schneider | 74/711 |
| 3,351,147 | 11/1967 | Williamson | 180/248 |
| 3,447,619 | 6/1969 | Nodwell et al. | 180/248 |
| 3,680,652 | 8/1972 | Greene | 180/248 |
| 4,286,686 | 9/1981 | Franke | 180/248 |
| 4,466,502 | 8/1984 | Sakai | 180/247 |
| 4,572,318 | 2/1986 | Cady | 180/248 |
| 4,676,336 | 6/1987 | Hiramatsu et al. | 180/248 |
| 4,719,998 | 1/1988 | Hiramatsu et al. | 192/0.033 |
| 4,727,966 | 3/1988 | Hiramatsu et al. | 192/0.033 |

FOREIGN PATENT DOCUMENTS

| | | | |
|---|---|---|---|
| 2138187 | 2/1973 | Fed. Rep. of Germany | 180/249 |
| 0139533 | 7/1985 | Japan | 180/248 |
| 60-252026 | 12/1985 | Japan . | |
| 60-252847 | 12/1985 | Japan . | |

Primary Examiner—Leslie A. Braun
Assistant Examiner—David Novais
Attorney, Agent, or Firm—Oblon, Fisher, Spivak, McClelland & Maier

[57] ABSTRACT

A vehicular four-wheel drive system which includes: an oil pump adapted to be actuated by the relative rotations of a first rotating shaft connected to front wheels and a second rotating shaft connected to rear wheels for discharging pressure oil; a hydraulic clutch having a cylinder chamber communicating with the discharge passage of the oil pump; an electromagnetic throttle valve for controlling the discharge pressure of the oil pump; and a control mechanism for changing the throttle opening of the electromagnetic valve in accordance with the running situation of the vehicle.

6 Claims, 4 Drawing Sheets

FOUR-WHEEL DRIVE SYSTEM

BACKGROUND OF THE INVENTION

1. Field of the Invention

The present invention relates to a four-wheel drive system including torque transmission means having an oil pump and a hydraulic clutch between the front and rear wheels of an automobile.

2. Description of the Prior Art

A four-wheel drive car, which is equipped with an oil pump to be driven by the difference in the rotating speeds of two rotating shafts connected to car front and rear wheels and a clutch for connecting and disconnecting said two rotating shafts in dependence upon the discharge pressure of the oil pump according to the difference in the rotating speeds, is well known in the art, as is disclosed in Japanese Patent Laid-Open No. 252026/1985, for example.

In this four-wheel drive car, the pressure oil discharged from the oil pump is released through a fixed orifice to the atmosphere so that the discharge pressure of the oil pump may be controlled to a level according to the difference in the rotating speeds of the rotating speed at the front and rear sides. Here, in this four-wheel drive car, the difference in the rotating speeds arises between the rotating shafts at the front and rear wheel sides in case either the front or rear wheel or wheels slip or in case the so-called "inner wheel difference" arises when the car turns.

However, the above-specified two cases of establishing the rotating speed difference between the two rotating shafts are absolutely different. In the former case, the transmission torque of the clutch has to be enhanced to shift the driving state from the two-wheel drive type to the four-wheel drive type. In the latter case, on the contrary, it is necessary to reduce the transmission torque of the clutch thereby to avoid the tight corner braking phenomenon which will occur when the car turns. It is, however, very difficult to control the pressure to levels appropriate for the two individual cases. If the throttle opening of the fixed orifice is set to avoid the braking phenomenon, the discharge pressure of the oil pump cannot be boosted when the front or rear wheel or wheels slip. As a result, the clutch slips when in the four-wheel drive to raise a problem that the power loss is increased.

SUMMARY OF THE INVENTION

It is, therefore, a major object of the present invention is to provide a vehicular four-wheel drive system which can control the discharge pressure of an oil pump for actuating a front-rear wheel connecting clutch properly in accordance with the running situation of the vehicle.

Another object of the present invention is to provide a vehicular four-wheel drive system which can reduce the discharge pressure of the oil pump in accordance with an increase in the steering angle of the vehicle but can hold the discharge pressure at a high level while the vehicle is running straight.

For brevity, the vehicular four-wheel drive system according to the present invention comprises an oil pump adapted to be actuated by the relative rotations of a first rotating shaft connected to front wheels and a second rotating shaft connected to rear wheels for discharging pressure oil; a hydraulic clutch having a cylinder chamber communicating with the discharge passage of said oil pump; an electromagnetic throttle valve for controlling the discharge pressure of said oil pump; and control means for changing the throttle opening of said electromagnetic valve in accordance with the running situation of the vehicle.

While the vehicle is running straight with the construction described above, the throttle opening of the electromagnetic throttle valve is reduced. If, in this state, the two rotating shafts make relative rotations even slightly due to the slippage of the front or rear wheel or wheels, the discharge pressure of the oil pump will be raised and introduced into the cylinder chamber of the hydraulic clutch so that the hydraulic clutch is brought into its directly connected state and held in the four-wheel drive state. When the vehicle makes a turn, on the contrary, the throttle opening of the electromagnetic throttle valve is enlarged. Even if the two rotating shafts are caused to rotate relative to each other due to the inner wheel difference or the like, the discharge pressure of the oil pump is not raised so that the hydraulic clutch comes into its open or easily slipping state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
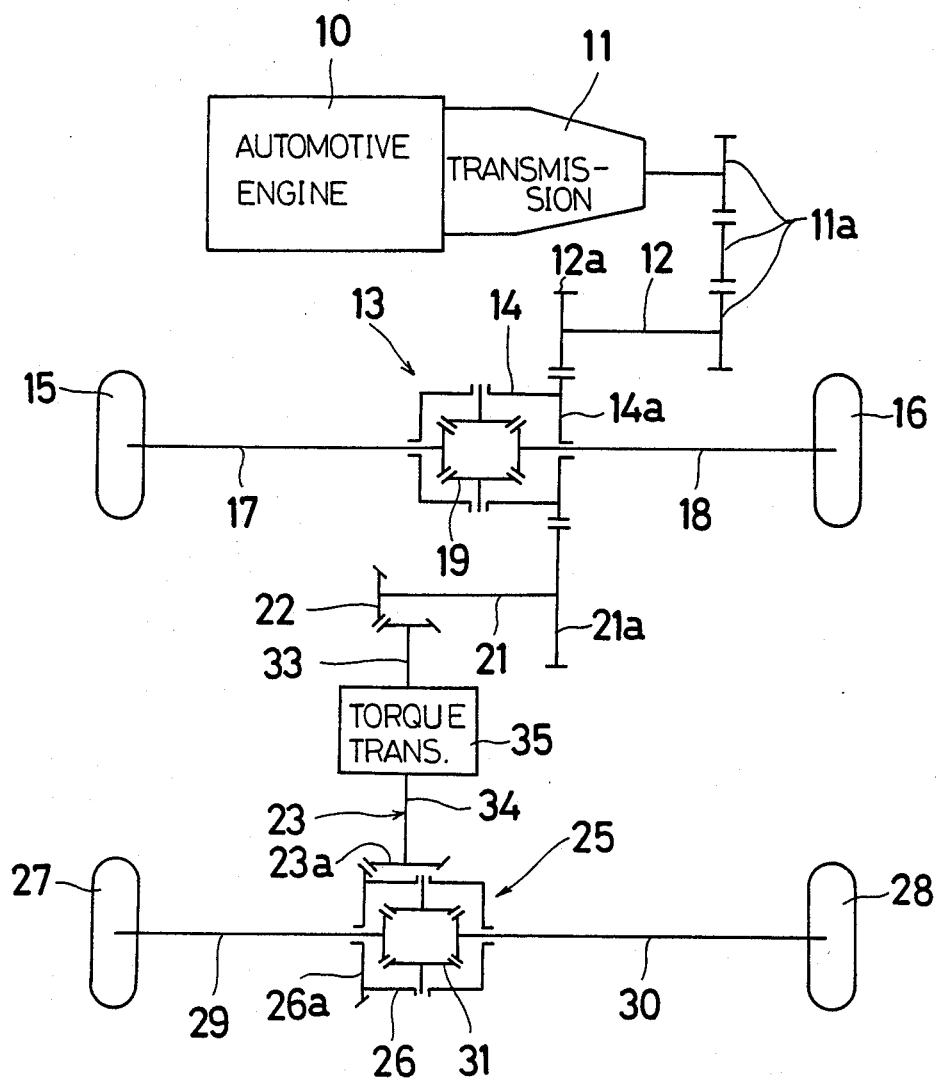
FIG. 1 is a schematic diagram showing the overall arrangement of the driving mechanism of a four-wheel drive car incorporating a four-wheel drive system according to one embodiment of the present invention.

In FIG. 1, reference numeral 10 designates the engine of an automobile, which has its output transmitted through a transmission 11 and a gear train 11a to a drive shaft 12. To this drive shaft 12, there is rotationally connected through a gear 12a and a differential case gear 14a the case 14 of a front differential 13, to which is connected through a differential gear mechanism 19 a pair of left and right front axles 17 and 18 bearing front wheels 15 and 16. As a result, the drive torque coming from the drive shaft 12 is divided and transmitted by the differential 13 to the left and right front axles 17 and 18 to rotationally drive the left and right front wheels 15 and 16.

To the differential case gear 14a, on the other hand, there is connected through a gear 21a a rear wheel output shaft 21, to which is connected through a bevel gear 22 a propeller shaft 23. To this propeller shaft 23, there is rotationally connected through a bevel gear 23a and a differential case bevel gear 26a the differential case 26 of a rear differential 25, to which in turn are connected through a differential gear mechanism 31 a pair of left and right rear axles 29 and 30 bearing rear wheels 27 and 28. As a result, the drive torque transmitted from the drive shaft 12 to the propeller shaft 23 is divided and transmitted by the differential 25 to the left and rear axles 29 and 30 to rotationally drive the left and right rear wheels 27 and 28.

Figure 2:
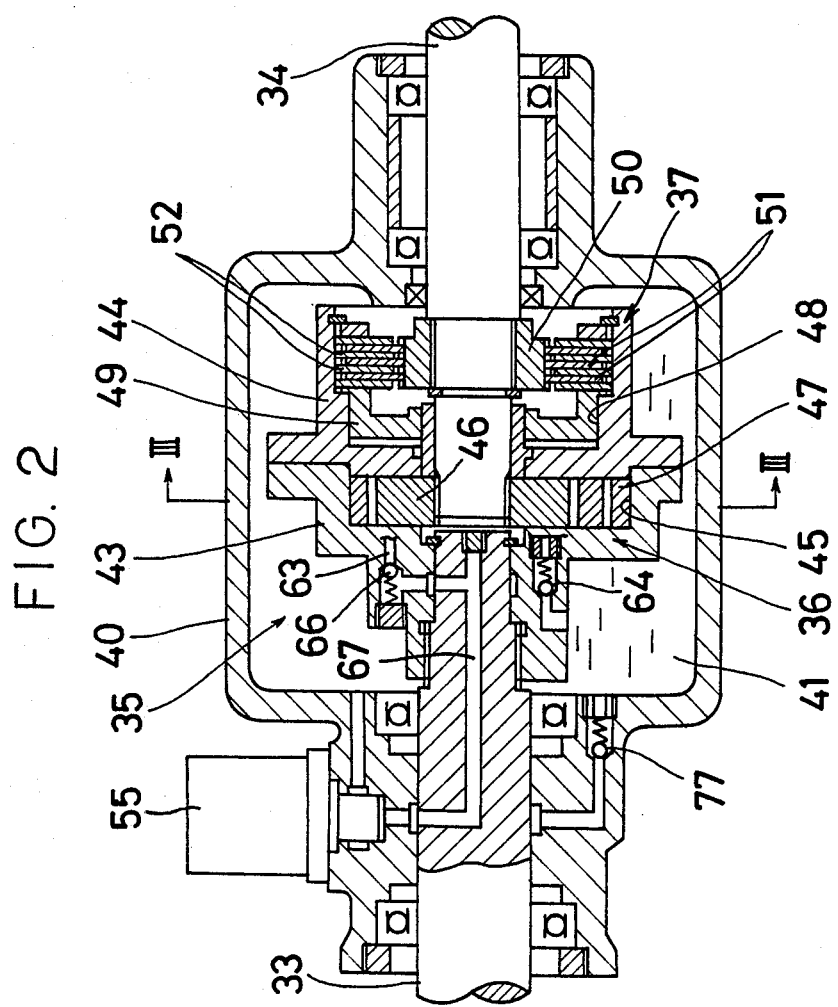
FIG. 2 is an enlarged longitudinal section showing the internal structure of torque transmission means to be used in the four-wheel drive system of the embodiment of the present invention.

The aforementioned propeller shaft 23 is divided into a first rotating shaft 33 connected to the front wheels and a second rotating shaft 34 connected to the rear wheels. These first and second rotating shafts 33 and 34 are connected to rotate relative to each other through torque transmission means 35 interposed inbetween. This torque transmission means 35 is constructed, as shown in FIG. 2, of an oil pump 36 adapted to be actuated by the relative rotations of the first and second rotating shafts 33 and 34 of the propeller shaft 23 for discharging pressure oil; and a hydraulic clutch 37 having a cylinder chamber for receiving the pressure oil discharged from the oil pump 36. The specific structure of the torque transmission means 35 will be described hereinbelow.

In FIG. 2, reference numeral 40 designates a stationary casing which is fixed on the vehicle body. In this casing 40, there are borne the first and second rotating shafts 33 and 34 which are made rotatable on a common axis. This casing 40 is formed with a compartment 41 for accommodating the oil pump 36 add the hydraulic clutch 37 and for acting as an oil reservoir for the oil pump 36. To one end of the first rotating shaft 33, there is splined a pump housing 43 having one end, to which is fixed a clutch housing 44 borne on one end of the second rotating shaft 34 such that it can rotate relative to the shaft 34. By the pump housing 43 and the clutch housing 44, there is defined a circular pump chamber 45 which is offset a predetermined distance from the common axis of the two rotating shafts 33 and 34. In this pump chamber 45, there are accommodated an inner gear 46 having external teeth and an outer gear 47 having internal teeth meshing eccentrically with the inner gear 46. Moreover, the inner gear 46 is splined to the second rotating shaft 34, whereas the outer gear 47 is fitted rotatably in the inner circumference of the pump chamber 45.

In the aforementioned clutch housing 44, there is formed a cylinder chamber 48 which is concentric to the second rotating shaft 34 and in which is slidably fitted a piston 49. To the second rotating shaft 34, there is splined a rotary stem 50 having an outer circumference, to which in turn are splined a plurality of clutch discs 51. To the inner circumference of the clutch housing 44, on the other hand, are splined a plurality of clutch discs 52 which are arranged alternately between the adjacent discs of the former clutch discs 51. As a result, when the piston 49 is pushed by the hydraulic force introduced into the cylinder chamber 48, the clutch discs 51 and 52 are forced into close contact with each other so that the drive torque transmitted from the front to the first rotating shaft 33 is transmitted to the second rotating shaft 34 through the two housings 43 and 44 and the clutch discs 51 and 52. This transmission torque is varied in accordance with the hydraulic force introduced into the cylinder chamber 48.

Reference numeral 55 designates an electromagnetic throttle valve which is mounted on the outer side of the aforementioned casing 40. This electromagnetic throttle valve 55 varies the throttle opening of a variable throttle 56 (as shown in FIG. 3) in accordance with a current value fed to its solenoid.

Next, the hydraulic circuit for hydraulically connecting the aforementioned oil pump 36, hydraulic clutch 37 and electromagnetic throttle valve 55 will be described with reference to FIG. 3.

Figure 3:
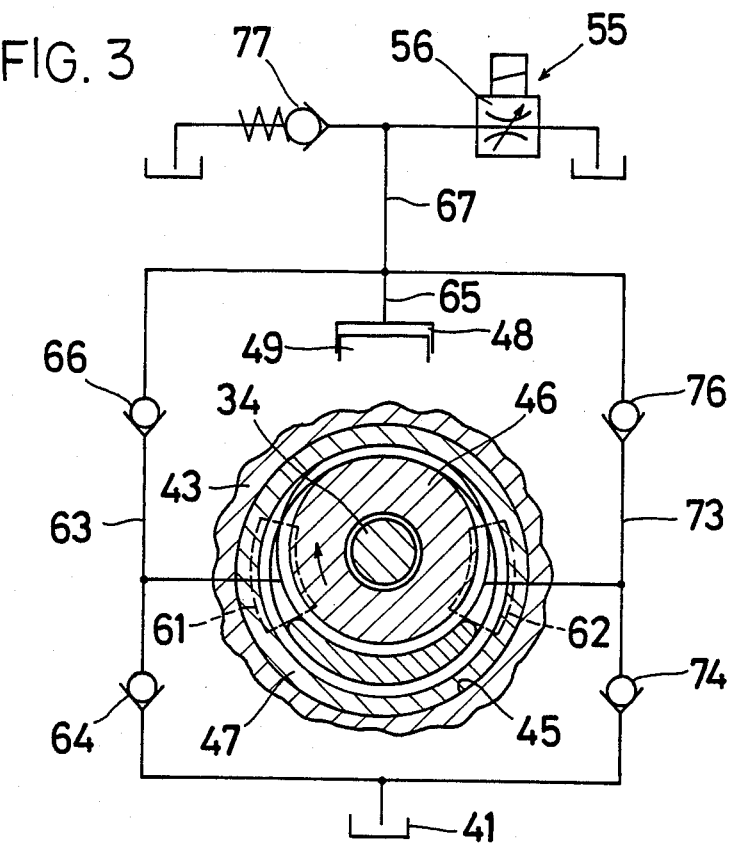
FIG. 3 is a partially sectional diagram showing the torque transmission means of FIG. 2 together with its control hydraulic elements and lines.

The aforementioned pump housing 43 is formed with two ports 61 and 62 opened into the pump chamber 45, as shown in FIG. 3. One port 61 is made to communicate with the oil tank (or reservoir) 41 via an oil passage 63 formed in the pump housing 43 and through a check valve 64. The oil passage 63 is connected with the cylinder chamber 48 through a check valve 66 and via an oil passage 65 formed in the clutch housing 44 and with an oil passage 67 formed in the first rotating shaft 33 through the check valve 66. The oil passage 67 in turn is made to communicate with the oil tank 41 through the variable throttle of the electromagnetic throttle valve 55 mounted on the aforementioned casing 40. Likewise, the other port 62 is made to communicate with the oil tank 41 via an oil passage 73 formed in the pump housing 43 and through a check valve 74. The oil passage 73 in turn is connected with the cylinder chamber 48 through a check valve 76 and via the aforementioned oil passage 65 and with the aforementioned oil passage 67 through the check valve 76. Incidentally, reference numeral 77 appearing in FIG. 3 designates a relief valve which is operated, when the pressure oil flowing through the oil passage 67 reaches a predetermined pressure, to regulate the upper limit of the oil pressure to be introduced into the cylinder chamber 48 of the hydraulic clutch 37.

Now, if the first and second rotating shafts 33 and 34 rotate relative to each other in the direction of arrow, for example, with the variable throttle 56 of the electromagnetic throttle valve 55 being closed, the working oil reserved in the oil tank 41 is sucked into one port 61 through the check valve 64 and via the oil passage 63 while the pressure oil is being discharged from the other port 62. This discharge oil will flow into the oil tank 41 by way of the oil passage 73, the check valve 76, the oil passage 67, and the variable throttle 56 of the electromagnetic throttle valve 55. Since, however, this variable throttle 56 is closed, the pressure oil discharged from the port 62 is boosted so that this high-pressure oil is introduced via the oil passage 65 into the cylinder chamber 48 to actuate the piston 49 thereby to force the clutch discs 51 and 52 into close contact.

Next, control means for controlling an output current value to be fed to the solenoid of the electromagnetic throttle valve 55 in accordance with the running speed and steering angle of the vehicle will be described.

Figure 4:
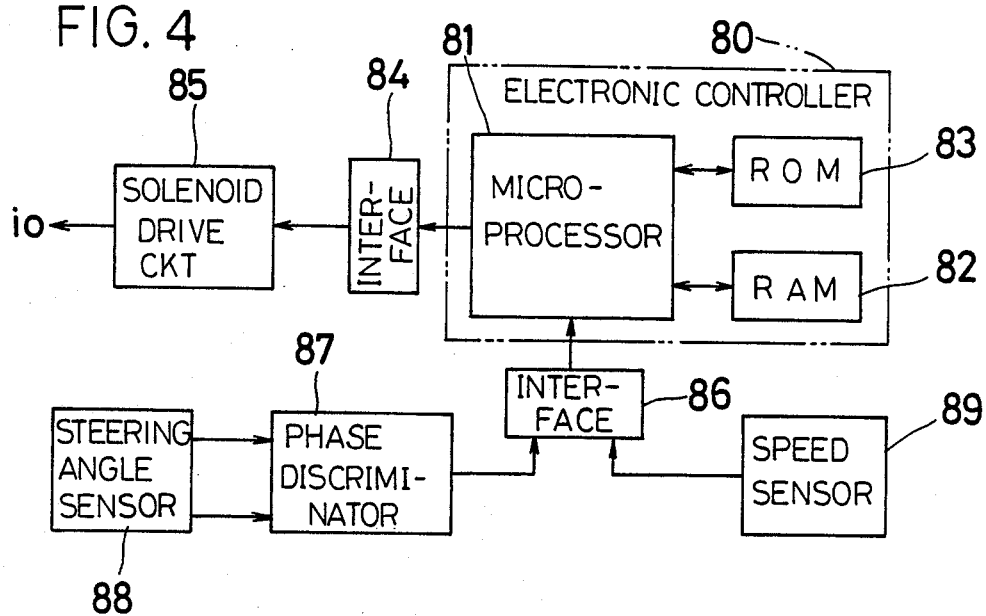
FIG. 4 is a block diagram showing control means for controlling an electromagnetic throttle valve of the torque transmission means of FIGS. 2 and 3.

In FIG. 4, reference numeral 80 designates electronic controller, which is constructed mainly of a microprocessor 81, a writable memory (which will be shortly referred to as "RAM") 82, and a read only memory (which will also be shortly referred to as "ROM") 83. With this microprocessor 81, there is connected through an interface 84 a solenoid driver 85 for controlling the current to be applied to the solenoid of the aforementioned electromagnetic throttle valve 55. A steering angle sensor 88 is also connected with the microprocessor 81 through an interface 86 and a phase discriminator 87. The steering angle sensor 88 is composed, although not shown in detail, of a rotary disc fixed on the steering shaft of the vehicle and two photo-interruptors for outputting a signal at each unit angle of that rotary disc. Thus, the steering angle sensor 88 detects a handle steering angle $\theta$ in terms of the signal of those photo-interruptors. To the microprocessor 81, there is also connected through the interface 86 a running speed sensor 89. This speed sensor 89 is composed of a tachometer (although not shown) connected to the output shaft of the transmission so that it may detect a running speed V in terms of the frequency of pulse signals generated by the speed sensor 89.

Figure 5:
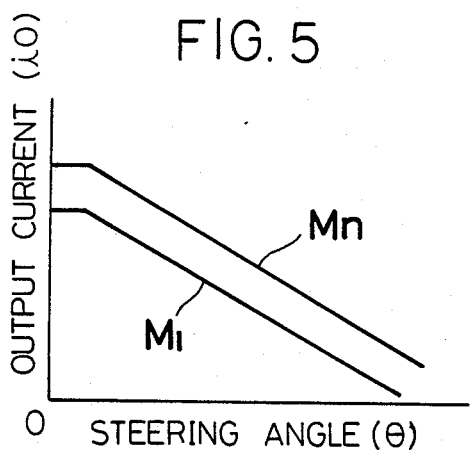
FIG. 5 is a graphical diagram presenting a map programmed with the current characteristics of the control means of FIG. 4 against the steering angle of the vehicle.

On the other hand, the aforementioned ROM 83 is stored with a map which is programmed with current characteristics against the steering angle $\theta$. This map is so preset that the current value $i_0$ is a maximum when the steering angle $\theta$ is 0 and decreases as the steering angle $\theta$ increases. A plurality of maps ($M_l$ to $M_n$) are prepared, as shown in FIG. 5, in accordance with the running speed V.

Figure 6:
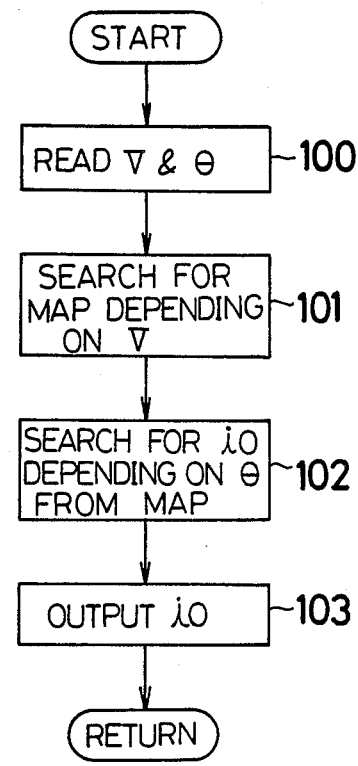
FIG. 6 is a flow chart showing a control program for effecting the control of the control means of FIG. 4 in accordance with the map of FIG. 5.

Next, the control program will be described with reference to FIG. 6.

Each time the vehicle runs a constant distance, an interruption signal is outputted. At step 100, in response to this interruption signal, the running speed V and steering angle $\theta$ detected by the running speed sensor 89 and the steering angle sensor 88 are read in and stored in the RAM 82. At step 101, one of the maps ($M_l$ to $M_n$) according to the running speed V is searched. Next, at step 102, the output current value $i_0$ according to the steering angle $\theta$ is read out from said one map. Subsequently at step 103, the output current $i_0$ is outputted and applied to the solenoid of the electromagnetic throttle valve 55 by the solenoid driver 85.

Figure 7:
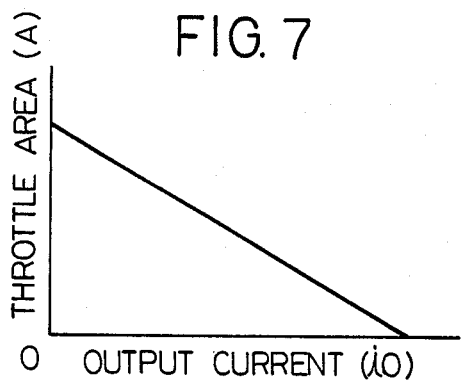
FIG. 7 is a graphical diagram presenting the throttle area of the electromagnetic throttle valve of FIG. 4 to be controlled by the control means of FIG. 4 in accordance with the current characteristics of the map of FIG. 5.

The electromagnetic throttle valve 55 has its throttle area A varied linearly with the current value $i_0$ applied to the solenoid, as shown in FIG. 7. Thus, in case the maximum current value $i_{0max}$ is applied to the solenoid while the vehicle is running straight, the throttle area A is 0, that is to say, the variable throttle 56 is shut off. As a result, if the first and second rotating shafts 33 and 34 make relative rotations even slightly to discharge the pressure oil from the oil pump 36, this pressure oil is introduced under a high pressure into the cylinder chamber 48 of the hydraulic clutch 37. As a result, the front and rear sides come into substantially direct connection through the clutch discs 51 and 52 so that the drive system is held in the four-wheel drive state.

If the vehicle is turned in this state, the current value $i_0$ to be applied to the solenoid of the electromagnetic throttle valve 55 is reduced in accordance with the steering angle $\theta$ so that the throttle area A of the variable throttle 56 is increased. As a result, the pressure oil held in the cylinder chamber 48 is discharged through the variable throttle 56 to the oil tank 41 so that the oil pressure acting upon the piston 49 is dropped to allow slippage of the clutch discs 51 and 52. Since, moreover, the throttle area of the variable throttle 56 thus increases, the pressure of the pressure oil discharged from the oil pump 36 is hardly boosted even with the slight relative rotations of the first and second rotating shafts 33 and 34 when the vehicle turns. Even in case the relative rotation angle of the two rotating shafts 33 and 34 is large, on the other hand, the pressure does not rise at most to the pressure corresponding to the throttle area of the variable throttle 56. This makes it possible to avoid the braking phenomenon when in the turn of the vehicle and to control the transmission torque of the hydraulic clutch 37 in response to the relative rotations of (or the slippage between) the front and rear sides thereby to enhance the steering stability.

Obviously, numerous modifications and variations of the present invention are possible in light of the above teachings. It is therefore to be understood that within the scope of the appended claims, the present invention may be practiced otherwise than as specifically described herein.

What is claimed is:

1. A four-wheel drive system having a torque transmission device between front wheels and rear wheels of a vehicle, said torque transmission device comprising:
   a stationary casing secured to a frame of said vehicle;
   an oil pump positioned in said casing and mechanically connected to be actuated by the relative rotations of a first rotating shaft connected to the front wheels and a second rotating shaft connected to the rear wheels for discharging pressure oil;
   a hydraulic clutch mounted in said casing, interposed between said first and second rotating shafts and having a cylinder chamber communicating with a discharge passage of said oil pump for selectively transmitting rotational power from one of said first and second rotating shafts to the other rotating shaft, the transmitted rotational power depending on the pressure of oil admitted in said cylinder chamber;
   an electromagnetic throttle valve fluidically connected to said discharge passage and having a solenoid for varying a throttle opening thereof in response to an electric current applied to said solenoid so as to control the pressure of oil admitted in said cylinder chamber;
   a speed sensor for detecting a traveling speed of said vehicle;
   a steering angle sensor for detecting a rotational angle of a steering wheel of said vehicle; and
   control means electrically connected to said speed sensor, said steering angle sensor and said solenoid of said electromagnetic throttle valve for applying to said solenoid an electric current depending on signals from said speed sensor and said steering angle sensor so as to vary the throttle opening of said electromagnetic throttle valve wherein said oil pump and said hydraulic clutch are mounted on facing end portions of said first and second rotating shafts, respectively, in tandem fashion.

2. A four-wheel drive system as set forth in claim 1, wherein:
   said first and second rotating shafts are rotatably carried by said stationary casing on a common axis, with said facing end portions thereof being located within said stationary casing.

3. A four-wheel drive system as set forth in claim 2, wherein said oil pump comprises:
   a generally cylindrical pump housing co-axially secured to said facing end portion of said first rotating shaft; and
   a rotor received in said pump housing and mounted on said facing end portion of said second rotating shaft so as to be rotated thereby; and wherein said hydraulic clutch comprises:

a generally cylindrical clutch housing secured to said pump housing in axial alignment therewith;

a plurality of outer discs received in said clutch housing and bodily rotatable therewith;

a plurality of inner discs bodily rotatable with said facing end portion of said second rotating shaft and axially arranged in alternate fashion with said plurality of outer discs; and a piston received in said clutch housing and disposed between said rotor and said plurality of outer and inner discs in an axial direction of said first and second rotating shafts.

4. A four-wheel drive system as set forth in claim 3, wherein said stationary casing serves as an oil reservoir for said oil pump.

5. A four-wheel drive system as set forth in claim 4, wherein said first and second rotating shafts are rotatably carried by said stationary casing between a front axle for rotating said front wheels and a rear axle for rotating said rear wheels.

6. A four-wheel drive system as set forth in claim 1, wherein said control means comprises;

memory means for storing a characteristic map defining various electric currents meeting steering angle and vehicle speed;

reading means for reading the signals from said speed sensor and said steering angle sensor at predetermined intervals;

search means for searching said characteristic map for an electric current corresponding to said signals read by said reading means; and output means for applying to said solenoid of said electromagnetic throttle valve said electric current searched by said search means.

* * * * *